(12) United States Patent
Kurosawa

(10) Patent No.: US 7,979,630 B2
(45) Date of Patent: *Jul. 12, 2011

(54) DATA PROTECTION FOR NON-VOLATILE SEMICONDUCTOR MEMORY BLOCK USING BLOCK PROTECTION FLAGS

(75) Inventor: Hitoshi Kurosawa, Kawasaki (JP)

(73) Assignee: Renesas Electronics Corporation, Kawasaki-Shi, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/884,862

(22) Filed: Sep. 17, 2010

(65) Prior Publication Data

US 2011/0010492 A1    Jan. 13, 2011

Related U.S. Application Data

(63) Continuation of application No. 12/180,666, filed on Jul. 28, 2008, now Pat. No. 7,822,914, which is a continuation of application No. 11/454,797, filed on Jun. 19, 2006, now Pat. No. 7,421,534.

(30) Foreign Application Priority Data

Jun. 20, 2005 (JP) ................................. 2005-178829

(51) Int. Cl.
*G06F 12/16* (2006.01)
*G11C 16/22* (2006.01)

(52) U.S. Cl. ... 711/103; 711/162; 711/163; 365/189.04; 365/195

(58) Field of Classification Search ............... 711/103, 711/152, 163, 164; 365/185.04, 195
See application file for complete search history.

(56) References Cited

U.S. PATENT DOCUMENTS

| 6,154,819 A | 11/2000 | Larsen et al. |
| 2003/0023822 A1 | 1/2003 | Scott et al. |
| 2004/0049645 A1 | 3/2004 | Lee et al. |

FOREIGN PATENT DOCUMENTS

| JP | 62-194565 A | 8/1987 |
| JP | 07-244611 A | 9/1995 |
| JP | 08-292915 A | 11/1996 |
| JP | 09-114743 A | 5/1997 |
| JP | 10-301855 A | 11/1998 |
| JP | 11-120781 | 4/1999 |
| JP | 2001-014871 A1 | 1/2001 |
| JP | 2003-203012 A1 | 7/2003 |

*Primary Examiner* — Jack A Lane

(74) *Attorney, Agent, or Firm* — Buchanan Ingersoll & Rooney PC

(57) ABSTRACT

Receiving a request for canceling setting, a control circuit erases data stored in a corresponding block, changes a value of a protection flag, and cancels protection setting. When an overall protection is set for any block, the control circuit prohibits access to all blocks, except when it is an operation mode for activating a memory program contained in the microcomputer. Further, control circuit permits an access to a block M only when partial protection is set, CPU is in the mode for activating a memory program contained in the microcomputer and the access is for reading an instruction code in accordance with an instruction fetch.

3 Claims, 9 Drawing Sheets

DATA PROTECTION FOR NON-VOLATILE SEMICONDUCTOR MEMORY BLOCK USING BLOCK PROTECTION FLAGS

CROSS REFERENCE TO RELATED APPLICATION

This application is a Continuation Application of application Ser. No. 12/180,666, filed Jul. 28, 2008, now U.S. Pat. No. 7,822,914 which in turn is a Continuation Application of application Ser. No. 11/454,797, filed Jun. 19, 2006, now U.S. Pat. No. 7,421,534, issued Sep. 2, 2008.

BACKGROUND OF THE INVENTION

1. Field of the Invention

The present invention relates to a semiconductor device including a non-volatile storage unit and, more specifically, to a semiconductor device with data confidentiality protecting function.

2. Description of the Background Art

Conventionally, microcomputers used for various purposes generally include a non-volatile storage unit (hereinafter also referred to as a non-volatile memory) such as a flash memory or an EEPROM (Electrically Erasable and Programmable Read Only Memory). When data is once written, a non-volatile memory retains the data even when the power is turned off, and it allows free rewriting of data. Therefore, a microcomputer embedded in a product with a program stored in a non-volatile memory advantageously allows a so-called updating, including program modification or addition of a new function.

When a user of a microcomputer including the non-volatile memory (hereinafter also referred to as an end user) as such should rewrite the program stored therein, operation failure or human suffering might possibly occur. There is also a concern that a competitor may unrighteously read the contents of the program. In order to prevent reading or rewriting (hereinafter also referred to as an access) by the end user, it has been a general practice to add a confidentiality protecting function (hereinafter also refereed to as "protection") to a microcomputer.

The protecting function is realized, by way of example, by arranging, in addition to a data area, a protection information area for setting protection for the data area in the non-volatile memory, and prohibiting access by a hardware circuit in accordance with a protection setting stored in the protection information area. Japanese Patent Laying-Open No. 11-120781 discloses a semiconductor memory device that allows flexible setting of write protection state by the unit of a block group of a memory array.

When a protected program is to be updated, the protection setting must be cancelled prior to rewriting of the program. Therefore, addition of a protection function inherently involves a protection canceling function.

The protection canceling function may be implemented by an arrangement in which a specific signal is applied from an external device connected to the microcomputer to cancel protection, or an arrangement in which protection is cancelled only when an input ID (password) matches a specific ID. Presence of such an arrangement itself, however, may be a security hole. Specifically, if an ill-intentioned third party should scrutinize the microcomputer and find the specific signal or the specific ID, the protection function would be lost.

In view of the foregoing, an arrangement in which protected data is erased before canceling protection has been proposed.

Japanese Patent Laying-Open No. 2001-014871 discloses a non-volatile semiconductor memory device in which, when cancellation of protection setting is instructed, all the stored data are erased, neglecting protection setting. Japanese Patent Laying-Open No. 2003-203012 discloses a microcomputer device that allows access to a non-volatile memory only after the data in the non-volatile memory has been erased.

Further, generally, a non-volatile memory is divided into a plurality of blocks, and data is read and written block by block. Therefore, Japanese Patent Laying-Open No. 2003-203012 discloses an arrangement in which protection is set block by block.

Microcomputers come to have higher performances recently, and programs for operating the microcomputers come to be larger and more complicated accordingly. Therefore, programmers come to use library software prepared for specific functions in advance, which is read (by sub-routine call) in a program, to improve efficiency of programming, rather than forming a program from scratch. Such library software is often provided by a so-called IP (Intellectual Property) vender, other than the manufacturer of the microcomputer.

In the arrangement disclosed in Japanese Patent Laying-Open No. 2001-014871, every memory is erased when the protection is to be cancelled. Therefore, when the capacity of a stored program is small as compared with the capacity of data area, the time required for erasure becomes relatively long, lowering the process speed of the microcomputer. In the arrangement disclosed in Japanese Patent Laying-Open No. 2003-203012, protection setting is done block by block, and therefore, when the program to be protected is stored over a plurality of blocks, it is necessary to set protection on every one of the plurality of blocks in which the program is stored. Such a process is so complicated as to cause data leakage because of erroneous setting of protection.

For an IP vendor, that library software is fetched and executed in a program is a common use and poses no problem. If the contents of library software itself (instruction codes) were read, however, unauthorized copying by a third party would be possible, which makes recovery of development expenditure difficult, or know-how would be leaked. Therefore, protection setting becomes necessary, to prevent reading of the contents of library software itself, by a programmer or an end user.

By the conventional protection function, access to the protected data is prohibited uniformly, no matter whether it is a reading while programming (sub-routine call) or not. Therefore, when the protection is set, use of library software becomes impossible, causing a dilemma.

SUMMARY OF THE INVENTION

The present invention was made to solve the above-described problem, and a first object thereof is to provide a semiconductor device that realizes high data confidentiality protecting function by simple processing while not lowering speed of processing.

A second object of the present invention is to provide a semiconductor device that allows confidentiality protection of stored instruction code itself and at the same time allows execution of a process based on the instruction code.

A third object of the present invention is to provide a semiconductor device that can attain the first and second objects simultaneously.

According to a first aspect, the present invention provides a semiconductor device, including: a non-volatile storage unit including a data area divided into a plurality of blocks and a protection information area storing protection information for prohibiting access block by block; a reading unit reading the protection information stored in the protection information area; and a control unit erasing, before canceling access prohibition of any of the blocks, data stored in the corresponding block. The control unit receives the protection information from the reading unit and prohibits access to every block to which access can be prohibited by the protection information, when access to any of the blocks of which access can be prohibited by the protection information is prohibited.

According to a second aspect, the present invention provides a semiconductor device, including: a non-volatile storage unit including a data area divided into a plurality of blocks and a protection information area storing protection information for prohibiting access block by block; a reading unit reading the protection information stored in the protection information area; a control unit erasing, before canceling access prohibition of any of the blocks, data stored in the corresponding block; and an operating unit reading an operation code stored in the data area and executing a process. The control unit determines whether an access to a block to which access is prohibited by the protection information may be permitted or not, based on the protection information received from the reading unit, and permits the access regardless of the protection information when an access request for reading the instruction code is received from the operating unit.

According to a third aspect, the present invention provides a semiconductor device, including: a non-volatile storage unit including a data area divided into a plurality of blocks and a protection information area storing first protection information and second protection information for prohibiting access block by block; a reading unit reading the first protection information and the second protection information stored in the protection information area; a control unit erasing, before canceling access prohibition of any of the blocks, data stored in the corresponding block; and an operating unit reading an operation code stored in the data area and executing a process. The control unit receives the first protection information from the reading unit, and prohibits access to every block to which access can be prohibited by the first protection information, when access to any of the blocks of which access can be prohibited by the first protection information is prohibited, determines, based on the second protection information received from the reading unit, whether an access to a block of which access can be prohibited by the second protection information may be permitted or not, and permits the access regardless of the second protection information when an access request for reading the instruction code is received from the operating unit.

According to the first aspect, when access prohibition is released, data is erased block by block. On the other hand, an access to any block is not permitted until access prohibition of every block, to which access can be prohibited, is released. Therefore, as compared with an example in which data stored in all blocks are erased collectively, data can be erased efficiently, and therefore, speed of processing is not lowered. Further, access prohibition of all blocks can be done integrally, and therefore, high data confidentiality protecting function can be realized.

According to the second aspect, an access to an access-prohibited block is not permitted, and when access prohibition is to be released, the data stored in the corresponding block is surely erased. As an exception, when the operating unit reads a process code stored in a data area to execute a process, access is permitted regardless of the protection information of the block as the access destination. Therefore, confidentiality of the instruction code itself is protected and, at the same time, the operating unit can execute the process based on the instruction code.

According to the third aspect, when access prohibition is released in accordance with the first protection information, data is erased block by block. On the other hand, an access to any block is not permitted until access prohibition of every block, to which access can be prohibited, is released. Therefore, as compared with an example in which data stored in all blocks are erased collectively, data can be erased efficiently, and therefore, speed of processing is not lowered. Further, access prohibition of all blocks can be done integrally, and therefore, high data confidentiality protecting function can be realized. Further, an access to a block to which access is prohibited by the second information is not permitted, and when access prohibition is to be released, the data stored in the corresponding block is surely erased. As an exception, when the operating unit reads a process code stored in a data area to execute a process, access is permitted regardless of the protection information of the block as the access destination. Therefore, confidentiality of the instruction code itself is protected and, at the same time, the operating unit can execute the process based on the instruction code.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
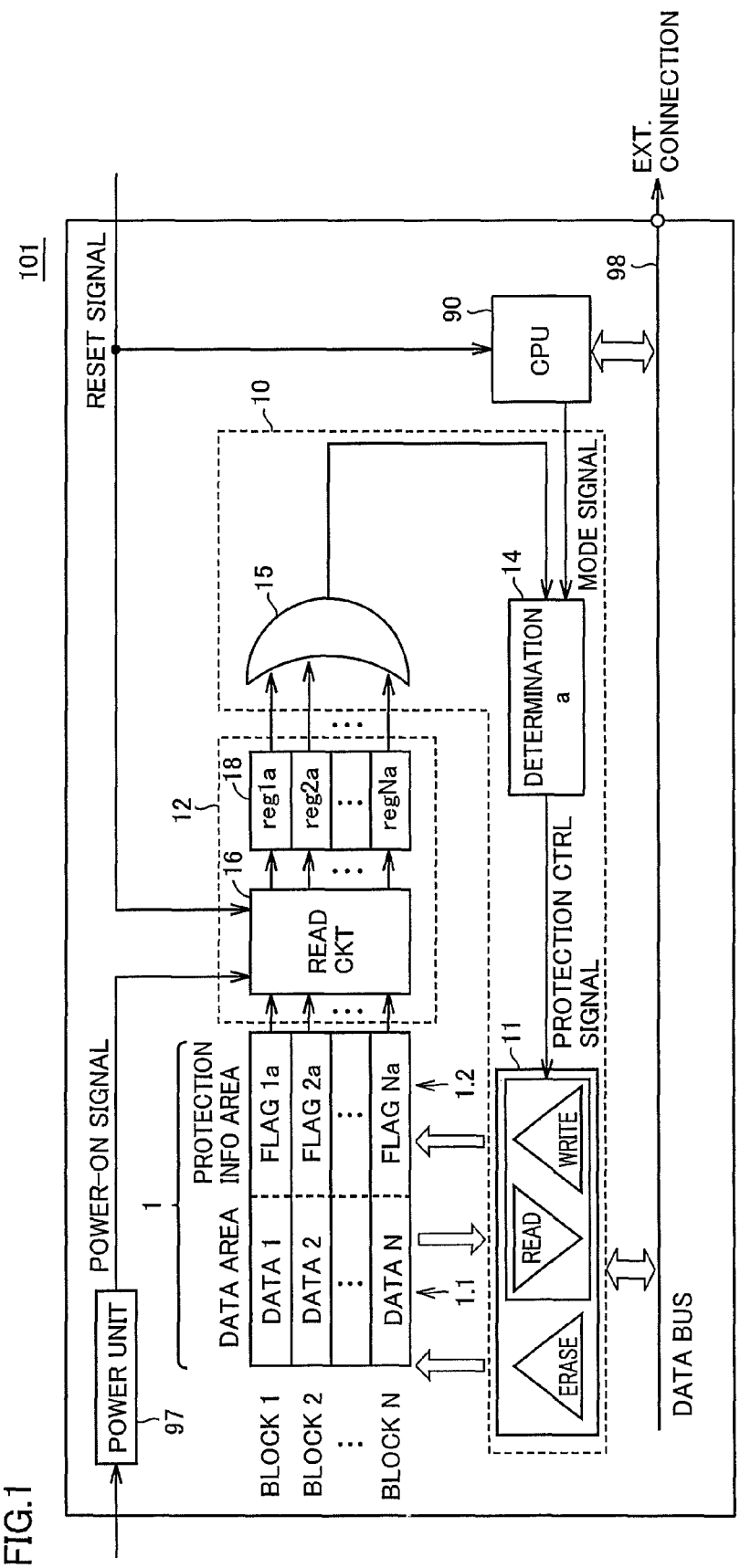
FIG. 1 shows a schematic configuration of a semiconductor device in accordance with Embodiment 1.

Embodiments of the present invention will be described in detail with reference to the figures. Throughout the figures, the same or corresponding portions are denoted by the same reference characters, and description thereof will not be repeated.

Embodiment 1

Embodiment 1 is directed to a protection function proposed for an IP vendor or a programmer considering protection against an end user.

Referring to FIG. 1, a semiconductor device 101 in accordance with Embodiment 1 includes a data bus 98, an operating unit (CPU: Central Processing Unit; hereinafter also denoted by "CPU") 90, a non-volatile memory 1, a reading unit 12, a control unit 10 and a power unit 97.

Data bus 98 connects CPU 90, control unit 10, an external memory (not shown) and an external device (not shown) to each other, mediating data exchange.

CPU 90 passes data to/from non-volatile memory 1 through data bus 98. Receiving a reset signal from the outside, CPU 90 reads a program stored in non-volatile memory 1 or an external memory (not shown) to be activated, in accordance with an operation mode, as will be described later. Further, when CPU 90 reads a program from non-volatile memory 1 to be activated, it outputs a mode signal thereof to control unit 10.

Non-volatile memory 1 is formed of a semiconductor device such as a flash memory or an EEPROM, and includes a data area 1.1 divided into a plurality of blocks and a protection information area 1.2.

Protection information area 1.2 is divided to correspond to the blocks of data area 1.1, and stores a protection setting corresponding to respective blocks of the data area. In protection information area 1.2 of Embodiment 1, overall protection flags 1a, 2a, . . . , Na, each of 1 bit, are stored, and dependent on the flag value ("0" or "1"), presence/absence of protection setting of respective blocks of data area 1.1 is determined.

Reading unit 12 reads overall protection flags 1a, 2a, . . . , Na stored in protection information area 1.2 of non-volatile memory 1, and outputs these to control unit 1. Reading unit 12 includes a read circuit 16 and a read register 18.

Read circuit 16 receives an external reset signal and a power-on signal from power unit 97, reads overall protection flags 1a, 2a, . . . , Na stored in protection information area 1.2 and outputs the read flags to read register 18.

Read register 18 once stores each of the overall protection flags 1a, 2a, . . . , Na and outputs their values to control unit 10. Read register 18 holds the values until the overall protection flags are newly received from read circuit 16. Therefore, the values output from read register 18 are updated only at the timing of receiving the external reset signal or receiving the power-on signal from power unit 97.

Control unit 10 includes an OR circuit 15, an activation mode determining unit (determining unit a) 14, and a control circuit 11.

OR circuit receives overall protection flags 1a, 2a, . . . , Na from read register 18 and performs a logical sum (OR) operation, and if protection is set for any one of overall protection flags 1a, 2a, . . . , Na, outputs "ON" to activation mode determining unit 14.

When "ON" is received from OR circuit 15, activation mode determining unit 14 outputs a protection control signal for prohibiting writing and reading (hereinafter also referred to as an access) to/from all the blocks of data area 1.1, to control circuit 11. When a mode signal is received from CPU 90 as an exception, activation mode determining unit 14 masks the protection control signal that prohibits an access. The reason for this is that CPU 90 reads a program stored in non-volatile memory 1 to be activated, and therefore, CPU 90 cannot be activated unless access prohibition is released.

Receiving a request for canceling protection setting for any of the blocks of data area 1.1 through the data bus, control circuit 11 erases data stored in the corresponding block, confirms erasure of the data, and thereafter, changes the value of protection flag corresponding to the block stored in protection information area 1.2, to cancel protection setting. Further, receiving an access request to any of the blocks of data area 1.1 through the data bus, control circuit 11 determines whether the protection control signal for prohibiting an access has been received from activation mode determining unit 14 or not. When the protection control signal for prohibiting an access is not received from activation mode determining unit 14, control circuit 11 permits the access, reads data stored in the requested block, or writes data to the requested block. When a protection setting request for any of the blocks of data area 1.1 is received through the data bus, control circuit 11 changes the value of overall protection flag corresponding to the block stored in protection information area 1.2, and sets protection.

Upon receiving an external instruction, power unit 97 starts power supply to various portions of semiconductor device 101 and, simultaneously with the start of power supply, outputs a power-on signal to read circuit 16.

As described above, semiconductor device 101 has a plurality of operation modes, and therefore, it is necessary to determine whether protection setting is effective or not, dependent on the operation mode.

Figure 2A:
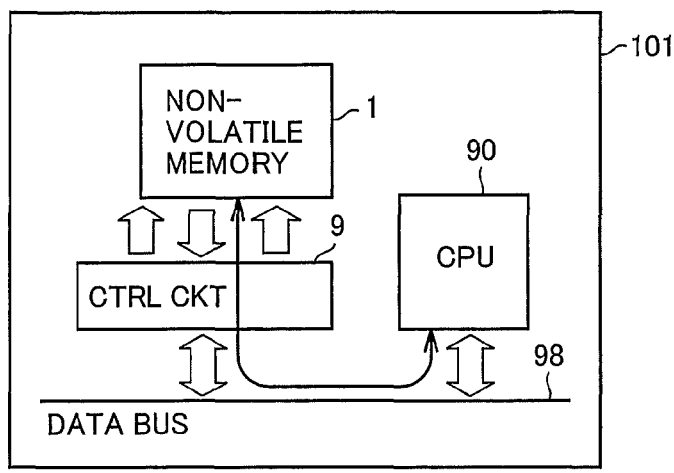
FIGS. 2A to 2C illustrate operation modes of the semiconductor device.

FIG. 2A represents an activation mode on a program in a memory of the microcomputer.

Figure 2B:
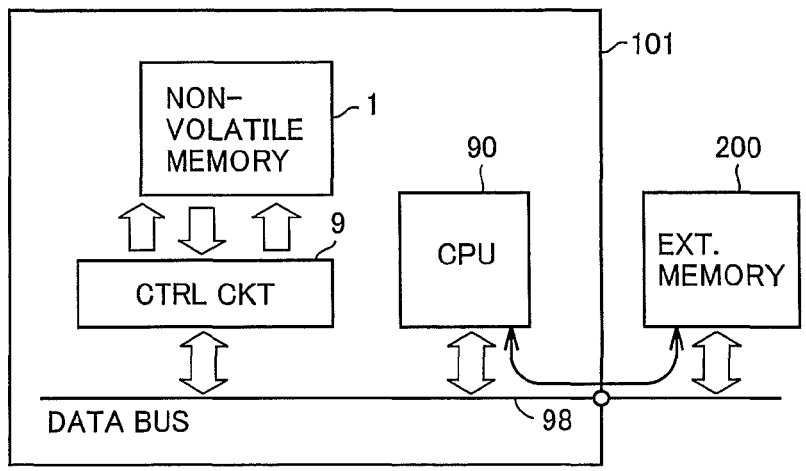

FIG. 2B represents an activation mode on a program in a memory outside the microcomputer.

Figure 2C:
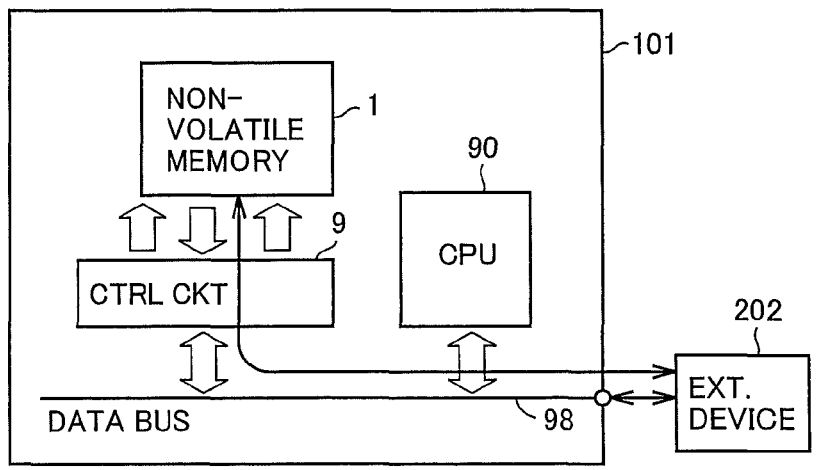

FIG. 2C represents a CPU inoperative activation mode.

Referring to FIG. 2A, in the "activation mode on a program in a memory of the microcomputer," CPU 90 reads a program from non-volatile memory 1 through data bus 98 to be activated. Therefore, to enable activation of CPU 90, protection of non-volatile memory 1 must be temporarily disabled.

Referring to FIG. 2B, in the "mode for activating a memory program outside the microcomputer," an external memory 200 is connected to semiconductor device 101 through data bus 98. CPU 90 reads a program from external memory 200 through data bus 98 to be activated. Here, it is possible for any person other than the IP vendor and the programmer to write a program in external memory 200, and therefore, an ill-intentioned program to read data stored in a protected block might possibly be executed. Therefore, in the "activation mode on a program in a memory outside the microcomputer," protection setting of non-volatile memory 1 is always kept effective, regardless of the state of processing of CPU 90.

Referring to FIG. 2C, in the "CPU inoperative activation mode," an external device 202 is connected to data bus 98 of semiconductor device 101. External device 202 directly accesses to non-volatile memory 1, regardless of the process by CPU 90. Here, it is possible for any person other than the IP vendor and the programmer to connect an external device 202 to semiconductor device 101, and therefore, it is possible for an ill-intentioned third party to directly read data stored in non-volatile memory 1. Therefore, in the "CPU inoperative activation mode," protection setting of non-volatile memory 1 is always kept effective, regardless of the state of processing of CPU 90.

(Protection Setting)

Again referring to FIG. 1, in a state where protection is set to none of the blocks in data area 1.1, when data to be protected is transferred from CPU 90 or from the outside, control circuit 11 writes the transferred data to a prescribed block. Further, when protection setting for the data is requested by CPU 90 or from the outside, control circuit 11 changes the value of overall protection flag of protection information area 1.2 corresponding to the block storing the data, and sets protection. Then, through similar processes, all the data stored in non-volatile memory 1 can be protected.

When a request for reading the data in the protected block is received, control circuit 11 responds by passing insignificant data other than the stored data. Further, when a request for writing data to the protected block is received, control circuit 11 performs no operation (neglect) or treats the request as a violation.

(Protection Canceling)

When cancellation of protection setting for any of the blocks in data area 1.1 is requested from CPU 90 or from the outside, control circuit 11 erases data stored in the designated block. Control circuit 11 confirms by an erasure verifying operation or the like that erasure of stored data has been complete, and then changes the value of overall protection flag of protect information area 1.2 corresponding to the block, to cancel protection setting of the block.

When protection is set for any of the blocks of data area 1.1, control circuit 11 prohibits access to every block, as it receives a protection control signal prohibiting access, from activation mode determining unit 14. Therefore, even when protection setting for a block is cancelled, it follows that protection is set for all the blocks of data area 1.1 as long as there is another block for which protection is set. Specifically, control circuit 11 does not permit access to any of the blocks of data area 1.1 unless protection setting for all the blocks of data area 1.1 is cancelled.

Therefore, access to data area 1.1 is allowed only after cancellation of protection setting is requested for every block in data area 1.1 by CPU 90 or from the outside and data stored in every block is erased.

Reading unit 12 does not update the value of protection flags until it receives an external reset signal or a power-on signal from power unit 97. Therefore, protection setting or cancellation is made effective when semiconductor device 101 is reset or when the power is restored.

As described above, when protection is set for at least one of the blocks of data area 1.1, protection is effective for all the blocks. Unless protection setting is cancelled for all the blocks of data area 1.1, all the blocks are kept protected.

Specifically, while protection of data area 1.1 can readily be set block by block, canceling protection setting of data area 1.1 requires complicated processing for each of the blocks.

According to Embodiment 1 of the present invention, when protection setting of the data area is to be cancelled, data is erased and values of protection flags are changed block by block. Therefore, as compared with collective erasure of all blocks, data can be erased efficiently, and therefore, speed of processing is not lowered. In order to cancel protection setting of the data area, protection setting for every block must be cancelled. Therefore, in order to cancel protection setting, data stored in every block must be erased. This realizes highly reliable data confidentiality protection function.

Further, according to Embodiment 1 of the present invention, control unit 10 permits an access from CPU 90 when CPU 90 is in the "activation mode on a program in a memory of the microcomputer," and does not permit any access when it is in other modes. Therefore, data leakage through a request from an external device connected to semiconductor device 101 can be prevented.

Embodiment 2

In Embodiment 1, a semiconductor device having a protection function proposed for an IP vendor or a programmer considering protection against an end user has been described.

In Embodiment 2, a semiconductor device having a protection function proposed for an IP vendor considering protection against a programmer or an end user will be described.

Figure 3:
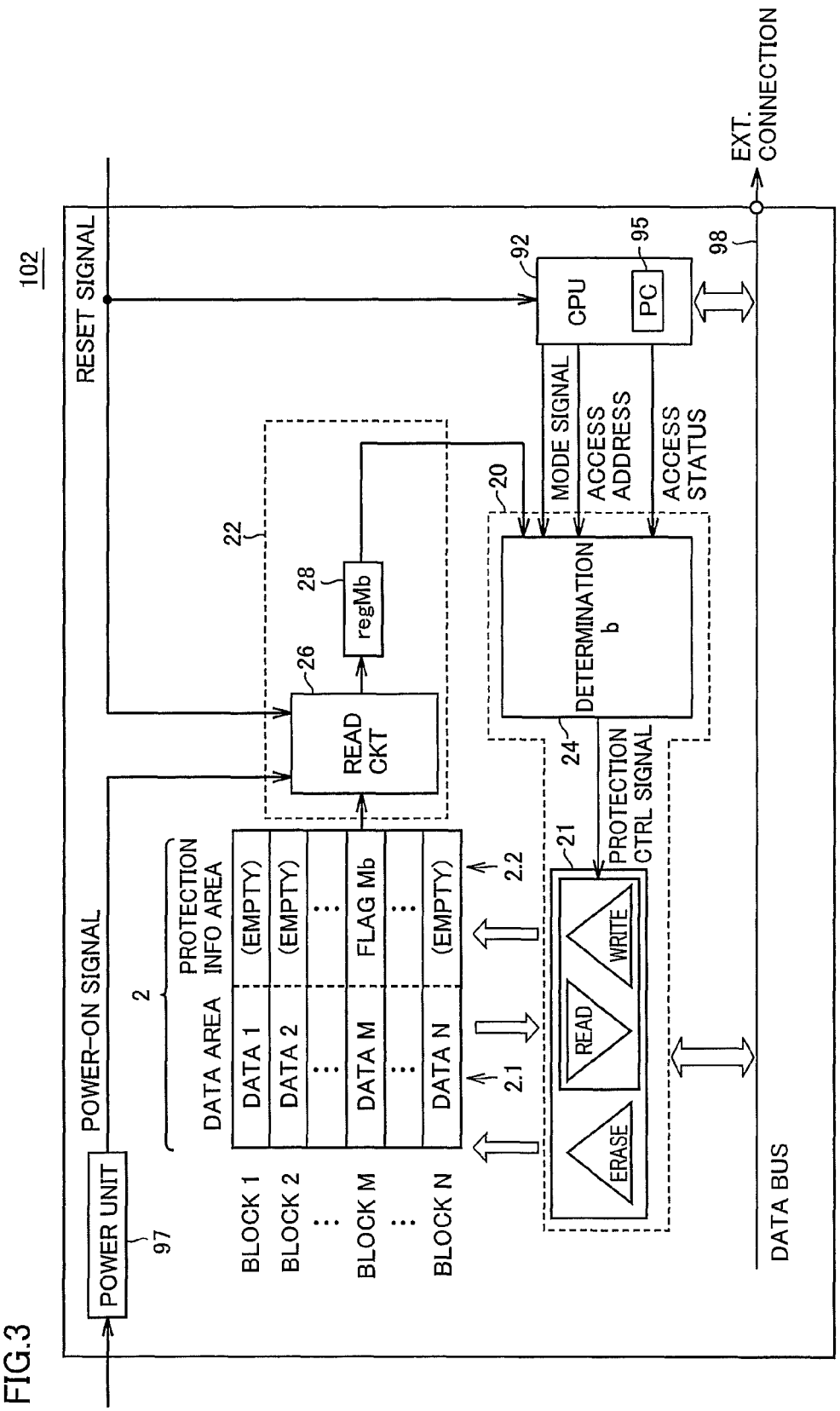
FIG. 3 shows a schematic configuration of a semiconductor device in accordance with Embodiment 2.

Referring to FIG. 3, a semiconductor device 102 in accordance with Embodiment 2 includes a data bus 98, a CPU 92, a non-volatile memory 2, a reading unit 22, a control unit 20 and a power unit 97.

Data bus 98 connects CPU 92, control unit 20, an external memory (not shown) and an external device (not shown) to each other, mediating data exchange.

CPU 92 passes data to/from non-volatile memory 2 through data bus 98. Similar to CPU 90 in accordance with Embodiment 1, when CPU 92 reads a program from non-volatile memory 2 to be activated (in the "activation mode on a program in a memory of the microcomputer"), it outputs a mode signal to control unit 20).

Further, CPU 92 includes a program counter (PC) 95, and in accordance with a program counter value of program counter 95, reads an instruction code from non-volatile memory 2 and executes processing. Such reading of an instruction code by CPU 92 is referred to as "instruction fetch." The program counter value is successively increased (count-up) as CPU executes processes.

Further, making an access to non-volatile memory 2, CPU 92 outputs an address of the access destination (hereinafter also referred to as an access address) of non-volatile memory 2 to control unit 20. At the same time, CPU 92 outputs a status signal (hereinafter also referred to as an access status), indicating whether the access is in accordance with an instruction fetch or an access to data other than the instruction fetch (hereinafter also referred as a data access), to control unit 20.

Non-volatile memory 2 is formed of a semiconductor device such as a flash memory or an EEPROM, and includes a data area 2.1 divided into a plurality of blocks and a protection information area 2.2.

Data area 2.1 is divided into blocks 1, 2, . . . , M, . . . , N, in which data 1, 2, . . . , M, . . . , N are stored, respectively.

Protect information area 2.2 is arranged to correspond to a prescribed block among the blocks included in data area 2.1, and protection setting for the prescribed block is stored therein. In protection information area 2.2 in accordance with Embodiment 2, a partial protection flag Mb of 1 bit for a block M among blocks 1, 2, . . . , M, . . . , N included in data area 2.1 is stored, and dependent on the flag value ("0" or "1"), presence/absence of protection setting for the block M is determined.

Reading unit 22 reads partial protection flag Mb stored in protection information area 2.2 of non-volatile memory 2, and outputs the same to control unit 20. Reading unit 22 includes a read circuit 26 and a read register 28.

Read circuit 26 receives an external reset signal or a power-on signal from power unit 97, reads partial protection flag Mb stored in protection information area 2.2 and outputs the read flag to read register 28.

Read register 28 once stores the partial protection flag Mb and outputs its value to control unit 20. Read register 28 holds the value until the partial protection flag Mb is newly received from read circuit 26. Therefore, the value output from read register 28 is updated only at the timing of receiving the external reset signal or receiving the power-on signal from power unit 97.

Control unit 20 includes an access mode determining unit (determining unit b) 24 and a control circuit 21.

Dependent on the partial protection flag Mb stored in read register 27, when protection is set for the block M, access mode determining unit 24 outputs a protection control signal for prohibiting an access to block M of data area 2.1, to control circuit 21. As an exception, only when the mode signal has been received from CPU 92 and it is a reading of an instruction code in accordance with an instruction fetch from CPU 92 to block M, access mode determining unit 24 masks the protection control signal for prohibiting the access. This is to permit only a sub-routine call when a program formed by a programmer is executed by CPU 92.

Receiving a request for canceling protection setting for block M of data area 2.1 through the data bus, control circuit 21 erases data stored in block M, confirms erasure of the data, and thereafter, changes the value of partial protection flag Mb for block M stored in protection information area 2.2, to cancel protection setting. Further, receiving an access request to block M of data area 2.1 through the data bus, control circuit 11 determines whether the protection control signal for prohibiting an access has been received from access mode determining unit 24 or not. When the protection control signal for prohibiting an access is not received, control circuit 21 permits the access, reads data stored in the requested block M, or writes data to the requested block M. Further, receiving a request for setting protection for block M of data area 2.1 through the data bus, control circuit 21 changes the value of partial protection flag Mb stored in protection information area 2.1 to set protection.

Power unit 97 is the same as that of Embodiment 1 and, therefore, detailed description thereof will not be repeated.

(Protection Setting)

In a state where protection is not set to block M in data area 2.1, when data to be protected is transferred from CPU 92 or from the outside, control circuit 21 writes the transferred data to block M. Further, when protection setting for the data is requested by CPU 92 or from the outside, control circuit 21 changes the value of partial protection flag Mb corresponding to block M storing the data, and sets protection.

As described above, with protection set for block M, control circuit 21 permits an access to block M when CPU 92 is in the "activation mode on a program in a memory of the microcomputer" and the access is for reading an instruction code in accordance with an instruction fetch. Therefore, when CPU 92 fetches an instruction code stored in a block other than block M, executes the instruction and makes a data access to block M during execution of the process, control circuit 21 prohibits the access.

When a request for reading the data in the protected block is received, control circuit 21 responds by passing insignificant data other than the stored data. Further, when a request for writing data to the protected block is received, control circuit 21 performs no operation (neglect) or treats the request as a violation.

(Protect Cancellation)

When cancellation of protection setting for block M in data area 2.1 is requested from CPU 90 or from the outside, control circuit 11 erases data stored in block M. Control circuit 21 confirms by an erasure verifying operation or the like that erasure of stored data has been complete, and then changes the value of partial protection flag Mb of protect information area 2.2, to cancel protection setting of block M.

As described above, control circuit 21 invalidates protection only for reading of an instruction code in accordance with an instruction fetch, of the library software stored in data area 2.1. Therefore, while realizing a sub-routine call in a program executed by CPU 92, leakage of instruction code itself can be prevented.

According to Embodiment 2 of the present invention, an access to the block for which protection is set is not permitted, and when protection setting is to be cancelled, the data stored in the corresponding block is erased reliably. As an exception, only when CPU 92 reads and processes a processing code such as library software stored in the data area, an access is permitted regardless of the protection information. Therefore, it becomes possible to prevent leakage of instruction code itself and to allow sub-routine call by the CPU 92 without restriction.

Embodiment 3

In Embodiments 1 and 2, protection functions directed to different objects have been described.

In Embodiment 3, a semiconductor device that can simultaneously realize functions of Embodiments 1 and 2 will be described. In the following description, for clarification, the protection in accordance with Embodiment 1 is also referred to as "overall protection," and protection in accordance with Embodiment 2 is also referred to as "partial protection."

Figure 4:
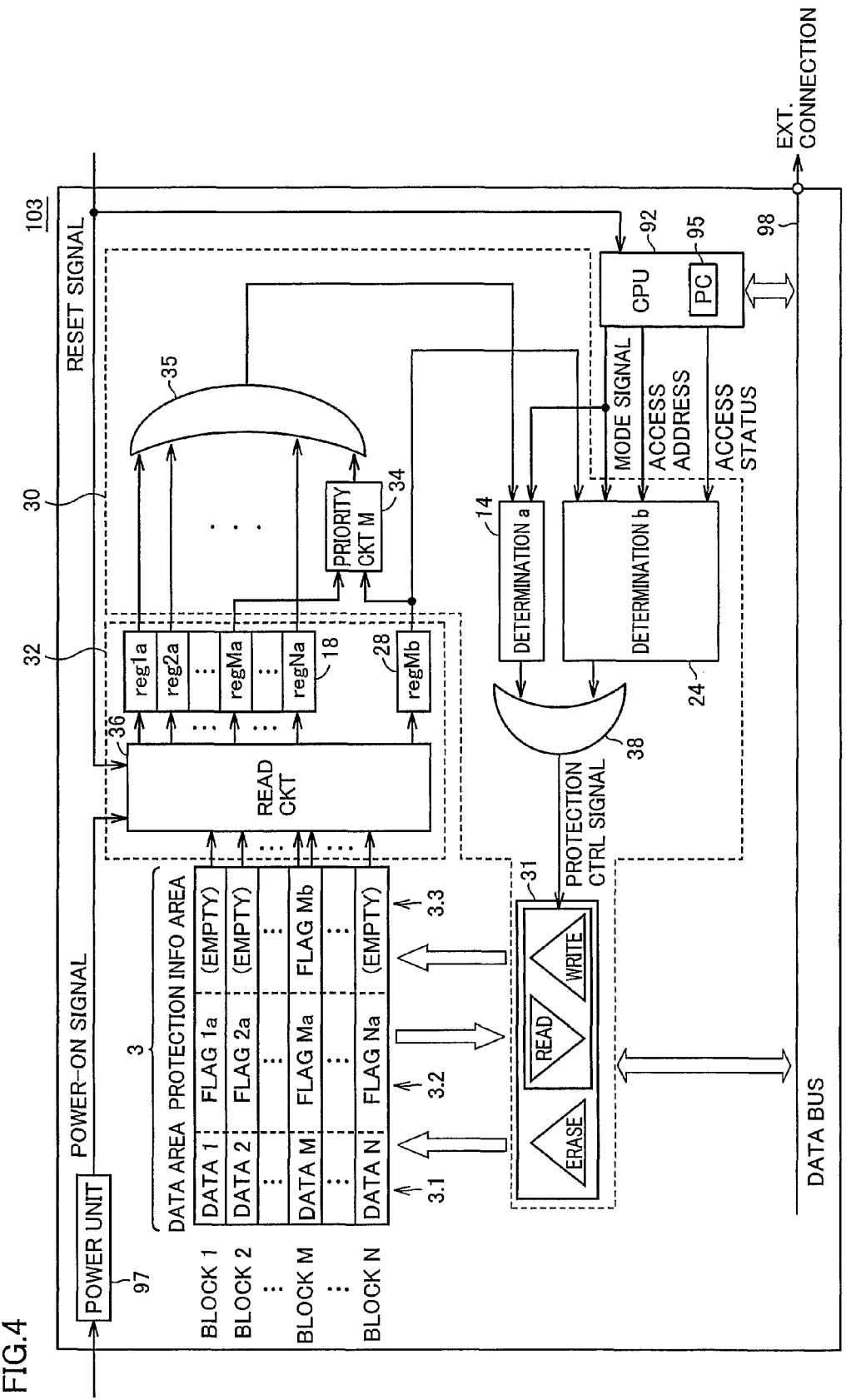
FIG. 4 shows a schematic configuration of a semiconductor device in accordance with Embodiment 3.

Referring to FIG. 4, a semiconductor device 103 in accordance with Embodiment 3 includes a data bus 98, a CPU 92, a non-volatile memory 3, a reading unit 32, a control unit 30 and a power unit 97.

Data bus 98 connects CPU 92, control unit 30, an external memory (not shown) and an external device (not shown) to each other, mediating data exchange.

CPU 92 passes data to/from non-volatile memory 3 through data bus 98. Similar to CPU 90 in accordance with Embodiment 1, when CPU 92 reads a program from non-volatile memory 3 to be activated (in the "activation mode on a program in a memory of the microcomputer"), it outputs a mode signal to control unit 30.

Further, similar to CPU 92 in accordance with Embodiment 2, CPU 92 includes a program counter (PC) 95, and in accordance with a program counter value of program counter 95, reads an instruction code from non-volatile memory 3 and executes processing. When making an access to non-volatile memory 3, CPU 92 outputs an access address and an access status to control unit 30.

Non-volatile memory 3 is formed of a semiconductor device such as a flash memory or an EEPROM, and includes a data area 3.1 divided into a plurality of blocks and protection information areas 3.2 and 3.3.

Data area 3.1 is divided into blocks 1, 2, . . . , M, . . . , N, in which data 1, 2, . . . , M, . . . , N are stored, respectively.

Protection information area 3.2 is divided to correspond to the blocks of data area 3.1, and stores overall protection setting for respective blocks of the data area. In protection information area 3.2 in accordance with Embodiment 3, overall protection flags 1a, 2a, . . . , Ma, . . . , Na, each of 1 bit, are stored, and dependent on the flag value ("0" or "1"), presence/absence of overall protection setting for each block of data area 3.1 is determined.

Protect information area 3.3 is arranged to correspond to a prescribed block among the blocks included in data area 3.1, and protection setting for the prescribed block is stored therein. In protection information area 3.3 in accordance with Embodiment 3, a partial protection flag Mb for a block M among blocks 1, 2, . . . , M, . . . , N included in data area 3.1 is stored, and dependent on the flag value ("0" or "1"), presence/absence of protection setting for the block M is determined.

Reading unit 32 reads overall protection flags 1a, 2a, . . . , Ma, . . . , Na and partial protection flag Mb stored in protection information areas 3.2 and 3.3 of non-volatile memory 3, and outputs these to control unit 30. Reading unit 32 includes a read circuit 36 and read registers 18 and 28.

Read circuit 36 receives an external reset signal or a power-on signal from power unit 97, reads overall protection flags 1a, 2a, . . . , Ma, . . . , Na stored in protection information area 3.2 and outputs these to read register 18, and reads partial protection flag Mb stored in protection information area 3.3 and outputs the read flag to read register 28.

Read register 18 is the same as that of Embodiment 1 and, therefore, detailed description will not be repeated. Further, read register 28 is the same as that of Embodiment 2 and, therefore, detailed description thereof will not be repeated.

Control unit 30 includes a priority circuit (priority circuit M) 34, OR circuits 35 and 38, an activation mode determining unit (determining unit a) 14, an access mode determining unit (determining unit b) 24, and a control circuit 31.

As will be described later, priority circuit 34 is for assigning higher priority to the partial protection than the overall protection in order to avoid a problem caused when overall protection and partial protection should be set simultaneously on block M. Receiving overall protection flag Ma and partial protection flag Mb set for block M of data area 3.1, priority circuit 34 gives priority to setting by partial protection flag Mb. Specifically, priority circuit 34 performs a logical operation between overall protection flag Ma received from read register 18 and partial protection flag Mb received from read register 28, and when partial protection is set by partial protection flag Mb, protection setting by overall protection flag Ma is neglected and a value indicating cancellation of overall protection is output to OR circuit 35.

OR circuit 35 performs a logical sum (OR) operation between the overall protection flags 1a, 2a, ..., Na (except for Ma) received from read register 18 and the value received from priority circuit 34, and if any one of the overall protection flags 1a, 2a, ..., Na (except for Ma) and the value received from priority circuit 34 has a value indicating setting of overall protection, outputs "ON" to activation mode determining unit 14.

Activation mode determining unit 14 is the same as that of Embodiment 1 and, therefore, detailed description thereof will not be repeated. Further, access mode determining unit 24 is the same as that of Embodiment 2 and, therefore, detailed description thereof will not be repeated.

OR circuit 38 couples a protection control signal output from activation mode determining unit 14 and a protection control signal output from access mode determining unit 24, and outputs the result to control circuit 31.

Receiving a request for canceling overall protection setting for any of the blocks of data area 3.1 through the data bus 98, control circuit 31 erases data stored in the corresponding block, confirms erasure of the data, and thereafter, changes the value of protection flag corresponding to the block stored in protection information area 3.2, to cancel overall protection setting. Receiving a request for canceling partial protection setting for block M of data area 3.1 through data bus 98, control circuit 31 erases data stored in block M, confirms erasure of the data, and thereafter, changes the value of partial protection flag Mb for block M stored in protection information area 3.3, to cancel partial protection setting. Control circuit 31 handles overall protection and partial protection independent from each other, and therefore, when a request for canceling overall protection setting for block M is received, it erases the stored data and thereafter changes the value of overall protection flag Ma for block M, while it does not change the value of partial protection flag Mb. Therefore, when both overall protection and partial protection are set, it is necessary to cancel both protection settings.

Receiving an access request to any of the blocks of data area 3.1 through data bus 98, control circuit 31 determines whether the protection control signal for prohibiting an access has been received from OR circuit 38 or not. When the protection control signal for prohibiting an access is not received, control circuit 31 permits the access, and reads data stored in the requested block, or writes data to the requested block.

When an overall protection setting request for any of the blocks of data area 3.1 is received through data bus 98, control circuit 31 changes the value of overall protection flag corresponding to the block stored in protection information area 3.2, and sets overall protection. Further, receiving a request for setting partial protection for block M of data area 3.1 through data bus 98, control circuit 31 changes the value of partial protection flag Mb stored in protection information area 3.3 to set partial protection.

Power unit 97 is the same as that of Embodiment 1 and, therefore, detailed description thereof will not be repeated.

(Protection Setting)

In a state where neither overall protection nor partial protection is set to data area 3.1, when data to be protected is transferred from CPU 92 or from the outside, control circuit 31 writes the transferred data to a prescribed block. Further, when overall protection setting or partial protection setting for the data is requested by CPU 92 or from the outside, control circuit 31 changes the value of overall protection flags 1a, 2a, ..., Ma, ..., Na or the value of partial protection flag Mb, corresponding to the block storing the data, and sets protection. Receiving the overall protection request or the partial protection request, control circuit 31 sets protection independent from each other.

Therefore, when overall protection is set by any of the overall protection flags 1a, 2a, ..., Ma, ..., Na, control circuit 31 prohibits access to every block, except when CPU 92 is in the "activation mode on a program in a memory of the microcomputer".

Further, when partial protection is set by partial protection flag Mb, control circuit 31 prohibits access to block M, even when CPU 92 is in the "activation mode on a program in a memory of the microcomputer". Control circuit 31 permits an access to block M only when CPU 92 is in the "activation mode on a program in a memory of the microcomputer" and the access is for reading an instruction code in accordance with an instruction fetch.

(Protect Cancellation)

When cancellation of overall protection setting or partial protection setting for any of the blocks in data area 3.1 is requested from CPU 92 or from the outside, control circuit 31 erases data stored in the designated block. Control circuit 31 confirms by an erasure verifying operation or the like that erasure of stored data has been complete, and then changes the value of overall protection flag or partial protection flag corresponding to the block, to cancel protection setting of the block. Receiving a request for canceling overall protection setting or partial protection setting, control circuit 31 cancels protection setting independent from each other.

Therefore, when overall protection and partial protection are set for the block M, it is necessary to apply a request for canceling each of the protection settings to control circuit 31, to cancel these protection settings.

(Priority Circuit)

As described above, the overall protection is a function enabling an IP vendor or a programmer to set protection against an end user. On the other hand, the partial protection is a function enabling an IP vendor to set protection against a programmer and an end user. In the common process of distribution, an IP vendor sets partial protection on the library software of himself/herself, and thereafter, a programmer sets an overall protection on the program he/she made. Then, the resulting semiconductor device is provided to the end user.

Assume that a programmer stores a program he/she made in a block other than block M, and then erroneously sets overall protection for block M. In order to update the program stored in data area 3.1 of non-volatile memory 3, it is necessary to cancel the overall protection setting of block M. As described above, in order to cancel protection setting, it is necessary to erase data stored in the corresponding block. Therefore, cancellation of overall protection for block M means erasure of the software library stored in block M. Specifically, it becomes necessary for the programmer to ask the IP vender to provide the library software again, simply to update the program he/she made.

Therefore, priority circuit 34 invalidates the overall protection setting for the block M in which library software is stored. Specifically, when partial protection is set for block M, priority circuit 34 regards block M as free of overall protection, even when the overall protection has been set simultaneously.

Therefore, even when a programmer erroneously sets overall protection for the block storing the library software, it is possible to update the program without erasing the library software.

Priority circuit 34 is only for correcting a mistake of a programmer or the like, and it is not an essential component. Provision of the circuit, however, is desirable to prevent any difficult situation possibly caused by an error or mistake.

According to Embodiment 3, when the overall protection of the data area is cancelled, data are erased and the values of overall protection flags are changed block by block. Therefore, as compared with collective erasure of all blocks, data can be erased efficiently, and therefore, speed of processing is not lowered. In order to cancel overall protection setting of the data area, overall protection setting for every block must be cancelled. Therefore, in order to cancel overall protection setting, data stored in every block must be erased. This realizes highly reliable data confidentiality protection function. An access to the block for which partial protection is set is not permitted, and when partial protection setting is to be cancelled, the data stored in the corresponding block is erased reliably. As an exception, only when CPU 92 reads and processes a processing code such as library software stored in the data area, an access is permitted regardless of the partial protection flag. Therefore, it becomes possible to prevent leakage of instruction code itself and to allow sub-routine call by the CPU 92 without restriction.

Further, according to Embodiment 3 of the present invention, when both overall protection and partial protection are set for one same block, partial protection is given priority, and overall protection is neglected. Therefore, even when overall protection should erroneously be set for a block that has already been under partial protection, it is possible to cancel setting of the overall protection of the block without erasing the data stored in that block and to update the data.

Embodiment 4

In Embodiments 1 to 3, arrangements for setting protection using the overall protection flags or the partial protection setting flag, each formed of 1 bit, have been described.

In Embodiment 4, an arrangement that uses an overall protection flag or a partial protection flag each formed of a plurality of bits will be described. In Embodiment 4, an example in which the characteristic arrangement applied to semiconductor device 103 of Embodiment 3 will be described.

Figure 5:
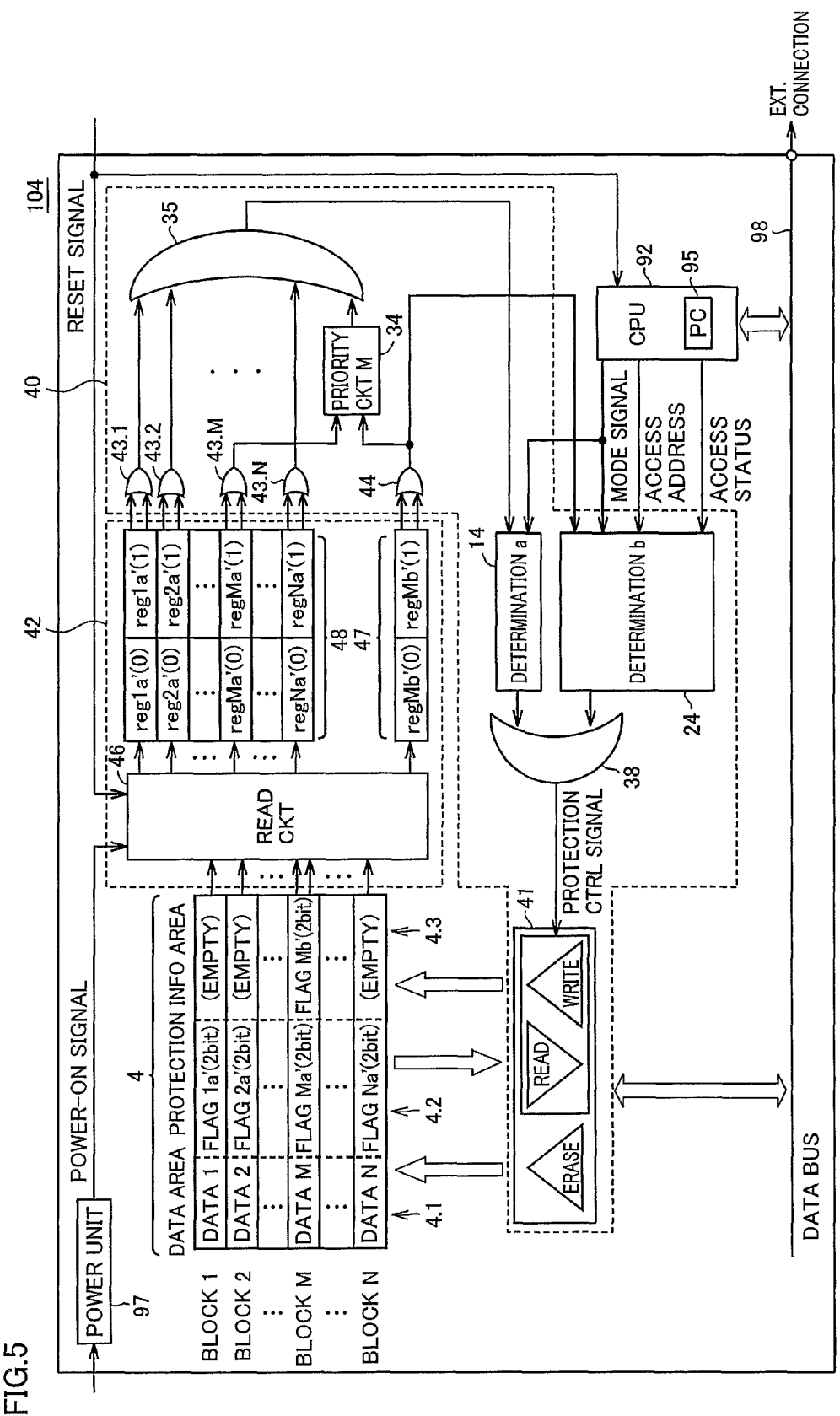
FIG. 5 shows a schematic configuration of a semiconductor device in accordance with Embodiment 4.

Referring to FIG. 5, a semiconductor device 104 in accordance with Embodiment 4 includes a data bus 98, a CPU 92, a non-volatile memory 4, a reading unit 42, a control unit 40 and a power unit 97.

Data bus 98 connects CPU 92, control unit 40, an external memory (not shown) and an external device (not shown) to each other, mediating data exchange.

CPU 92 is the same as that of Embodiment 3 and, therefore, detailed description thereof will not be repeated.

Non-volatile memory 4 includes a data area 4.1 divided into a plurality of blocks and protection information areas 4.2 and 4.3.

Data area 4.1 is divided into blocks 1, 2, ..., M, N, in which data 1, 2, ..., M, ..., N are stored, respectively.

Protection information area 4.2 is divided to correspond to the blocks of data area 4.1, and stores overall protection setting for respective blocks of the data area. In protection information area 4.2 in accordance with Embodiment 4, overall protection flags 1a', 2a', ..., Ma', ..., Na', each of 2 bits, are stored, and dependent on the flag value (e.g., "00" or "11"), presence/absence of overall protection setting for each block of data area 4.1 is determined.

In protection information area 4.3, partial protection setting for a block M among blocks included in data area 4.1 is stored. In protection information area 4.3 in accordance with Embodiment 4, a partial protection flag Mb' of 2 bits is stored, and dependent on the flag value (e.g., "00" or "11"), presence/absence of partial protection setting for the block M is determined.

Reading unit 42 reads overall protection flags 1a', 2a', ..., Ma', ..., Na' and partial protection flag Mb' stored in protection information areas 4.2 and 4.3 of non-volatile memory 4, and outputs these to control unit 40. Reading unit 42 includes a read circuit 46 and read registers 48 and 47.

Read circuit 46 receives an external reset signal and a power-on signal from power unit 97, reads overall protection flags 1a', 2a', ..., Ma', ..., Na' stored in protection information area 4.2 and outputs these bit by bit to read register 48. At the same time, it reads partial protection flag Mb' stored in protection information area 4.3 and outputs the read flag bit by bit to read register 47.

Read register 48 once stores each of overall protection flags 1a', 2a', ..., Ma', ..., Na' bit by bit, and outputs values of respective bits to control unit 40.

Read register 47 once stores partial protection flag Mb' bit by bit and outputs the value of each bit to control unit 40.

Control unit 40 corresponds to control unit 30 in accordance with Embodiment 3, with OR circuits 43.1, 43.2, ..., 43.M, ..., 43.N and 44 added.

OR circuit 43.1 reads the 0th bit value 1a'(0) and 1st bit value 1a'(1) of the overall protection flag 1a' stored in read register 48, and performs an OR operation. Then, OR circuit 43.1 outputs the result of logical sum operation to OR circuit 35. Specifically, OR circuit 43.1 determines that protection is set, when at least one of the 0th bit value 1a'(0) and 1st bit value 1a(1) of overall protection flag 1a' is a value for setting protection.

In the similar manner, OR circuits 43.2, ..., 43.M, ..., 43.N read the 0th bit values 2a'(0), ..., Ma'(0), ..., Na'(0) and 1st bit values 2a'(1), ..., Ma'(1), ..., Na' (1) of the overall protection flags 2a', ..., Ma', ..., Na', and perform OR operations. Then, OR circuits 43.2, ..., 43.M, ..., 43.N output results of logical sum operations to OR circuit 35.

Receiving a request for setting overall protection for any of the blocks of data area 4.1 through data bus 98, control circuit 41 changes all bits constituting the overall protection flag corresponding to the block stored in protection information area 4.2 to the same value, to set protection. Further, receiving a request for setting protection for block M of data area 4.1 through data bus 98, control circuit 41 changes all bits constituting the partial protection flag Mb stored in protection information area 4.3 to the same value, to set protection. Receiving a protection cancellation request, control circuit 41 changes all bits constituting the overall protection flag stored in protection information area 4.2 or all bits constituting partial protection flag Mb stored in protection information area 4.3 to the same value in the similar manner as for setting protection, to cancel protection. Specifically, control circuit 41 writes "00" or "11" dependent on whether protection is to be set or cancelled.

Other processes by control circuit 41 are the same as those of control circuit 31 in accordance with Embodiment 3 and, therefore, detailed description thereof will not be repeated.

Further, priority circuit 34, OR circuits 35 and 38, activation mode determining unit (determining unit a) 14 and access mode determining unit (determining unit b) 24 are the same as those of Embodiment 3 and, therefore, detailed description thereof will not be repeated.

Power unit 97 is the same as that of Embodiment 3 and, therefore, detailed description thereof will not be repeated.

As described above, control circuit 41 sets protection by setting a plurality of bits constituting the flag to the same value. Therefore, even if a bit forming the flag were volatilized and lost by some cause, protection setting can be maintained.

By way of example, assume that the flag value indicating protection setting is "1". Receiving a request for setting overall protection for block 1, control circuit 41 changes the 0th bit value 1a'(0) and the 1st bit value 1a'(1) of overall protection flag 1a' both to "1". Similarly, receiving a request for canceling overall protection setting for block 1, control circuit 41 erases data stored in block 1, and changes the 0th bit value 1a'(0) and the 1st bit value 1a'(1) of overall protection flag 1a' both to "0". Specifically, receiving a request for setting protection, control circuit 41 changes the values of protection flag to "11" and receiving a request for canceling protection setting, changes the values of protection flag to "00".

Assume that from a state where overall protection is set for block 1, that is, where the values of overall protection flag 1a' have been changed to "11", 1 bit of data is volatilized by some cause to "10". In that case, the values applied to OR circuit 43.1 are changed from "1" and "1" to "1" and "0". The value output from OR circuit 43.1, however, is kept "1", and hence, overall protection setting is not cancelled.

Therefore, even when a bit constituting the protection flag were volatilized by some cause, erroneous cancellation of protection setting can be avoided. As is apparent from the foregoing, by increasing the number of bits constituting the protection flag, protection function can be enhanced.

Though an example in which the characteristic arrangement described above is applied to the semiconductor device in accordance with Embodiment 3 that simultaneously realizes the overall protection function of Embodiment 1 and the partial protection function of Embodiment 2 has been described in Embodiment 4, the arrangement can similarly be applied to the semiconductor device in accordance with Embodiment 1 or the semiconductor device in accordance with Embodiment 2.

According to Embodiment 4, in addition to the effect attained by Embodiment 3, even if the overall protection flag for setting overall protection or the partial flag for setting partial protection were volatilized by some cause, the protection set by the protection flag would not be cancelled unless all the bit values constituting the flag are changed. Therefore, as compared with an example using protection flag of 1 bit, a semiconductor device with enhanced protection function can be provided.

Embodiment 5

In Embodiments 2 to 4, arrangements for setting partial protection for one of the plurality of blocks forming the data area have been described.

In Embodiment 5, an arrangement for setting partial protection integrally for a plurality of blocks will be described. In Embodiment 5, an example in which the characteristic arrangement is applied to the semiconductor device of Embodiment 4 will be described.

When library software stored in the non-volatile memory has large capacity and cannot be contained in one block, the software is stored across a number of blocks. In that case, it is desirable that the library software is handled as one integral unit. Therefore, a function that regards a plurality of blocks as one block and sets partial protection integrally over the plurality of blocks becomes necessary.

Figure 6:
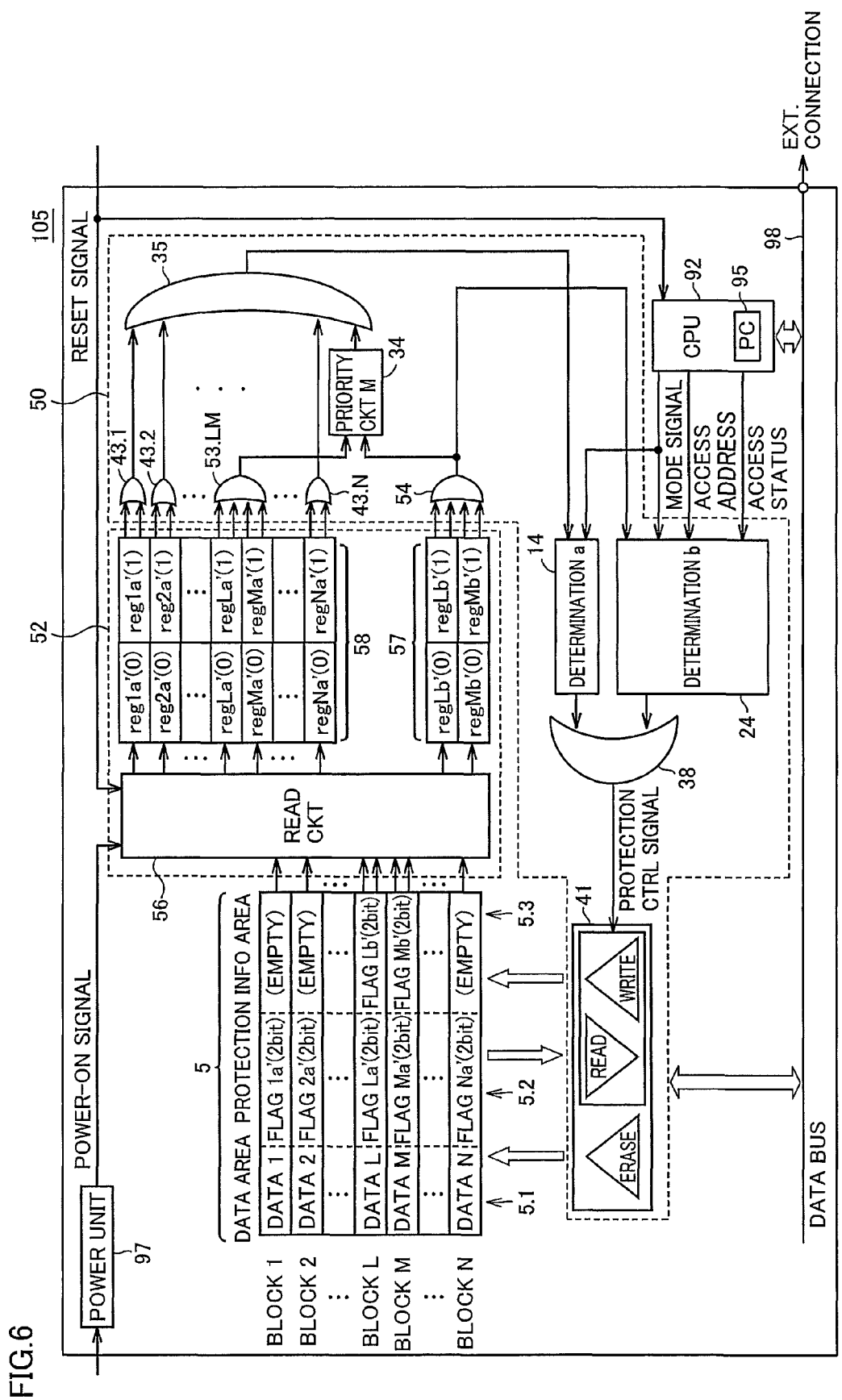
FIG. 6 shows a schematic configuration of a semiconductor device in accordance with Embodiment 5.

Referring to FIG. 6, a semiconductor device 105 in accordance with Embodiment 5 includes a data bus 98, a CPU 92, a non-volatile memory 5, a reading unit 52, a control unit 50 and a power unit 97.

Data bus 98 connects CPU 92, control unit 50, an external memory (not shown) and an external device (not shown) to each other, mediating data exchange.

CPU 92 is the same as that of Embodiment 4 and, therefore, detailed description thereof will not be repeated.

Non-volatile memory 5 includes a data area 5.1 divided into a plurality of blocks and protection information areas 5.2 and 5.3.

Data area 5.1 is divided into blocks 1, 2, ..., L, M, ..., N, in which data 1, 2, ..., L, M, ..., N are stored, respectively.

Protection information area 5.2 is divided to correspond to the blocks of data area 5.1, and stores overall protection flags 1a', 2a', ..., La', Ma', ..., Na'.

Protection information area 5.3 stores a partial protection flag for setting partial protection for a plurality of blocks among the blocks forming data area 5.1. In Embodiment 5, partial protection flags Lb' and Mb' for setting partial protection for blocks L and M are stored.

Similar to Embodiment 4, overall protection flags 1a', 2a', ..., La', Ma', ..., Na' and partial protection flags Lb' and Mb' are each formed of 2 bits.

Reading unit 52 reads overall protection flags 1a', 2a', ..., La', Ma', ..., Na' and partial protection flags Lb' and Mb' stored in protection information areas 5.2 and 5.3 of non-volatile memory 5, and outputs these to control unit 50. Reading unit 52 includes a read circuit 56 and read registers 58 and 57.

Read circuit 56 receives an external reset signal and a power-on signal from power unit 97, reads overall protection flags 1a', 2a', ..., La', Ma', ..., Na' and outputs these to read register 58. At the same time; it reads partial protection flags Lb' and Mb' and outputs the read flags to read register 57.

Read register 58 once stores each of overall protection flags 1a', 2a', ..., La', Ma', ..., Na' bit by bit, and outputs values of respective bits to control unit 50.

Read register 57 once stores partial protection flags Lb' and Mb' bit by bit and outputs the value of each bit to control unit 50.

Control unit 50 corresponds to control unit 40 in accordance with Embodiment 4, with OR circuits 43.L and 43.M replaced by an OR circuit 53.LM, and OR circuit 44 replaced by an OR circuit 54.

OR circuit 53.LM reads the 0th bit value La'(0) and 1st bit value La'(1) of the overall protection flag La' and the 0th bit value Ma'(0) and 1st bit value Ma'(1) of the overall protection flag Ma' stored in read register 58, and performs a logical sum (OR) operation. Then, OR circuit 53.LM outputs the result of logical sum operation to priority circuit 34.

Similarly, OR circuit 54 reads the 0th bit value Lb'(0) and 1st bit value Lb'(1) of the partial protection flag Lb' and the 0th bit value Mb'(0) and 1st bit value Mb'(1) of the partial protection flag Mb' stored in read register 57, and performs a logical sum (OR) operation. Then, OR circuit 54 outputs the result of logical sum operation to priority circuit 34.

Specifically, OR circuits 53.LM and 54 determine that overall protection or partial protection is set for blocks L and M, when overall protection or partial protection is set for at least one of blocks L and M.

Priority circuit 34, OR circuits 35 and 38, activation mode determining unit (determining unit a) 14 and access mode determining unit (determining unit b) 24 are the same as those of Embodiment 4 and, therefore, detailed description thereof will not be repeated.

Power unit 97 is the same as that of Embodiment 4 and, therefore, detailed description thereof will not be repeated.

As described above, when at least one of partial protection flags Lb' and Mb' is set for protection, OR circuit 54 provides an output indicating that partial protection is set for blocks L and M. When partial protection is set for block L or M, control circuit 41 prohibits any access to blocks L and M, except for an access in accordance with an instruction fetch from CPU 92. In order to cancel partial protection of block L or M, it is necessary to erase all data stored in blocks L and M.

Thus, integral protection of data stored in blocks L and M is made possible.

Though an arrangement for setting partial protection over two blocks among a plurality of blocks included in the data area has been described in Embodiment 5, the number of blocks is not limited to two. The number of blocks may appropriately be designed considering, for example, the volume of library software to be stored.

Though an example in which the characteristic arrangement described above is applied to the semiconductor device of Embodiment 4 has been described in Embodiment 5, the arrangement can similarly be applied to the semiconductor device in accordance with Embodiment 2 or Embodiment 3 having the partial protection function.

According to Embodiment 5, in addition to the effects of Embodiment 4, partial protection can be set across a plurality of blocks, and setting and cancellation of partial protection for the blocks can be done in an integrated manner. Therefore, even when library software comes to be large volume and must be stored over a plurality of blocks, leakage of process codes can be prevented in the similar manner as when the software is stored in one block.

Embodiment 6

In Embodiment 5, an arrangement for setting partial protection integrally across a plurality of blocks has been described.

In Embodiment 6, an arrangement that allows independent setting of a plurality of partial protections will be described. In Embodiment 6, an example in which the characteristic arrangement is applied to the semiconductor device 104 in accordance with Embodiment 4 will be described.

When library software is supplied by a plurality of IP vendors, a function that allows partial protections for a plurality of blocks independent from each other becomes necessary.

Figure 7:
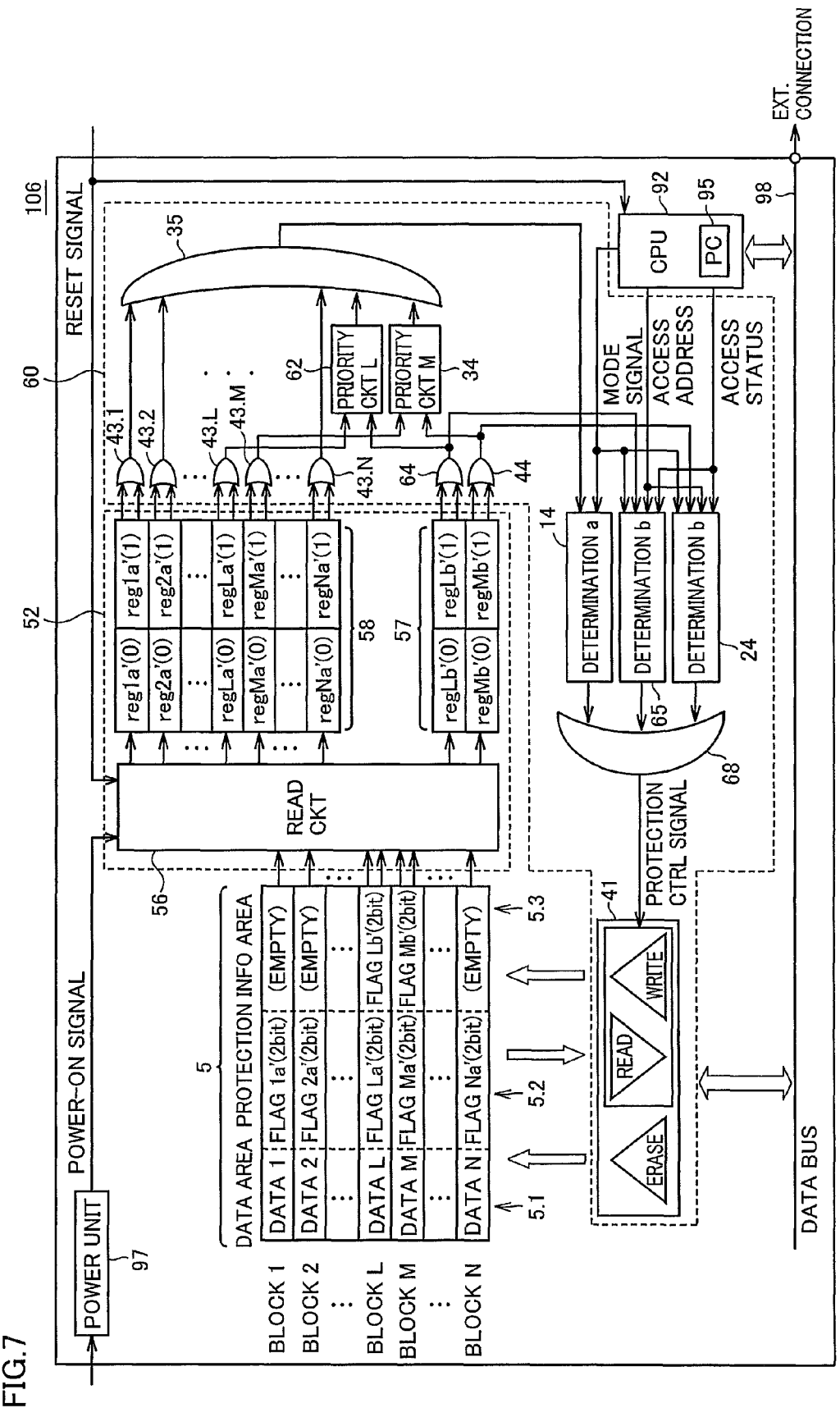
FIG. 7 shows a schematic configuration of a semiconductor device in accordance with Embodiment 6.

Referring to FIG. 7, a semiconductor device 106 in accordance with Embodiment 6 includes a data bus 98, a CPU 92, a non-volatile memory 5, a reading unit 52, a control unit 60, and a power unit 97.

Data bus 98 connects CPU 92, control unit 60, an external memory (not shown) and an external device (not shown) to each other, mediating data exchange.

CPU 92 is the same as that of Embodiment 4 and, therefore, detailed description thereof will not be repeated.

Non-volatile memory 5 and reading unit 52 are the same as those of Embodiment 4 and, therefore, detailed description thereof will not be repeated.

Control unit 60 corresponds to control unit 40 of Embodiment 4, with an OR circuit 64, a priority circuit (priority circuit L) 62 and an access mode determining unit (determining unit b) 65 added and OR circuit 38 replaced by OR circuit 68.

OR circuit 64 reads the 0th bit value Lb'(0) and 1st bit value Lb'(1) of partial protection flag Lb' stored in read register 57, and performs a logical sum (OR) operation. Then, OR circuit 64 outputs the result of logical sum operation to priority circuit 62.

Priority circuit 62 performs a logical operation between the value of overall protection flag La' received from OR circuit 43.L and the value of partial protection flag Lb' received from OR circuit 64, and when partial protection is set by the partial protection flag Lb', neglects the setting of overall protection by overall protection flag La', and outputs a value indicating cancellation of overall protection to OR circuit 35.

Similar to access mode determining unit 24 of Embodiment 4, access mode determining unit 65 outputs a protection control signal inhibiting an access to block L of data area 5.1 to OR circuit 68, when partial protect is set for block L, based on the value of partial protection flag Lb' output from OR circuit 64. As an exception, when the mode signal is received from CPU 92 and it is a reading of an instruction code in accordance with an instruction fetch for block L from CPU 92, access mode determining unit 65 masks the protection control signal inhibiting the access.

OR circuit 68 couples protection control signals output from activation mode determining unit 14 and access mode determining units 65 and 24, respectively, and outputs the result to control circuit 41.

Priority circuit 34, OR circuit 35, activation mode determining unit 14, and access mode determining unit 24 are the same as those of Embodiment 4 and, therefore, detailed description will not be repeated.

Power unit 97 is the same as that of Embodiment 4 and, therefore, detailed description will not be repeated.

As described above, access mode determining units 65 and 24 determine whether partial protection is set for blocks L and M, dependent on the values of partial protection flags Lb' and Mb', respectively. Priority circuits 62 and 34 determine whether setting of overall protection flags La' and Ma' is effective or not, dependent on the values of partial protection flags Lb' and Mb', respectively.

Therefore, overall protection or partial protection is set for the data stored in blocks L and M, independent from each other.

In Embodiment 6, an arrangement in which partial protection is independently set for two of the plurality of blocks included in the data area has been described. The number of blocks is not limited to two, and the number may appropriately be designed considering, for example, the number of IP vendors.

Though an example in which the characteristic arrangement described above is applied to the semiconductor device of Embodiment 4 has been described in Embodiment 6, the arrangement can similarly be applied to the semiconductor device in accordance with Embodiment 2 or Embodiment 3 having the partial protection function.

According to Embodiment 6, in addition to the effects attained by Embodiment 4, it becomes possible to set partial protection independently for each of the plurality of blocks. Therefore, when a plurality of IP vendors provide library software, partial protection can be set independently, and the data for which partial protection has been set is effective for any person including other IP vendors. Therefore, when a plurality of IP vendors provide library software for one same semiconductor device, leakage of process codes of the software can be prevented.

Embodiment 7

In Embodiment 1, an arrangement that allows setting of overall protection for all the blocks forming the non-volatile memory has been described.

In Embodiment 7, an arrangement will be described which allows setting of overall protection only for limited blocks among the blocks forming the non-volatile memory. In Embodiment 7, an example in which the characteristic arrangement is applied to semiconductor device 101 of Embodiment 1 will be described.

When a program to be stored is small for the data area of the non-volatile memory, it may be possible to store user data in addition to the program. In that case, if all the blocks forming the non-volatile memory were under overall protection, it would be impossible for an end user to access the user data. Therefore, the arrangement is provided which allows setting of overall protection only for the block storing a program among the blocks forming the non-volatile memory.

Figure 8:
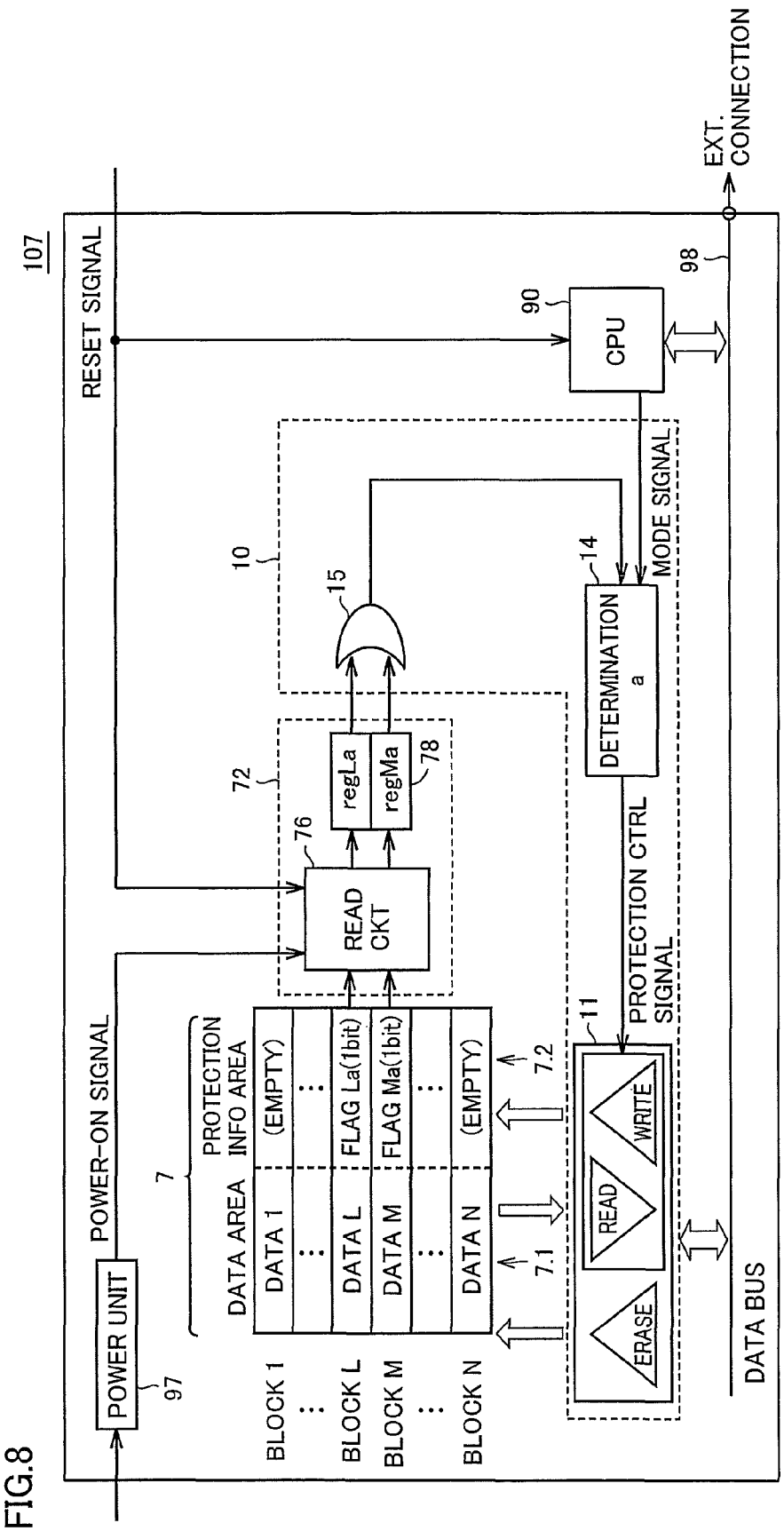
FIG. 8 shows a schematic configuration of a semiconductor device in accordance with Embodiment 7.

Referring to FIG. 8, a semiconductor device 107 in accordance with Embodiment 7 includes a data bus 98, a CPU 90, a non-volatile memory 7, a reading unit 72, a control unit 10 and a power unit 97.

Data bus 98 connects CPU 90, control unit 10, an external memory (not shown) and an external device (not shown) to each other, mediating data exchange.

CPU 90 is the same as that of Embodiment 1 and, therefore, detailed description thereof will not be repeated.

Non-volatile memory 7 includes a data area 7.1 divided into a plurality of blocks and a protection information area 7.2. Data area 7.1 is divided into blocks 1, 2, ..., L, M, ..., N, in which data 1, 2, ..., L, M, ..., N are stored, respectively.

Protection information area 7.2 is arranged to correspond to prescribed blocks among the blocks included in data area 7.1, and stores overall protection setting for the prescribed blocks. In protection information area 7.2 of Embodiment 7, overall protection flags La and Ma for blocks L and M included in data area 7.1 are stored.

Reading unit 72 reads overall protection flags La and Ma stored in protection information area 7.2 of non-volatile memory 7, and outputs these to control unit 10. Reading unit 72 includes a read circuit 76 and read register 78.

Read circuit 76 receives an external reset signal and a power-on signal from power unit 97, reads overall protection flags La and Ma stored in protection information area 7.2 and outputs these to read register 78.

Read register 78 once stores overall protection flags La and Ma, and outputs their values to control unit 10.

Control unit 10 and power unit 97 are the same as those of Embodiment 1 and, therefore, detailed description thereof will not be repeated.

As described above, control unit 10 determines whether overall protection is set for blocks L and M, dependent on the values of overall protection flags La and Ma. Further, when overall protection is set neither for block L nor block M, control unit 10 permits an access to blocks L and M.

Specifically, it is not possible to set overall protection for blocks other than blocks L and M included in non-volatile memory 7. This allows such a manner of use that a program or the like as an object of protection is stored in blocks L and M and other blocks are opened for the end user.

Though an arrangement in which overall protection is set for two blocks among the plurality of blocks included in the data area has been described in Embodiment 7, the number of blocks is not limited to two. The number of blocks for which overall protection can be set may appropriately be designed considering, for example, program volume.

Though an example in which the characteristic arrangement described above is applied to the semiconductor device of Embodiment 1 has been described in Embodiment 7, the arrangement can similarly be applied to any of the semiconductor devices in accordance with Embodiments 3 to 6 having the overall protection function.

According to Embodiment 7, effects attained by Embodiment 1 are attained and, in addition, overall protection is set only for some of the blocks forming the non-volatile memory. Therefore, when the volume of a program as the object of overall protection is small as compared with the capacity of the non-volatile memory, it becomes possible to open the blocks other than those storing the program, to the end user, and thereby to more efficiently use the non-volatile memory. Consequently, it becomes possible to use the non-volatile memory for a plurality of different uses, and capacity of non-volatile memory contained in the semiconductor device can reasonably be determined.

Embodiment 8

In Embodiments 1 to 7, arrangements in which a data area and a protection information area are arranged in the non-volatile memory have been described.

In Embodiment 8, an arrangement will be described in which only the data area is arranged in the non-volatile memory and data and protection information flag are stored in the data area. In Embodiment 8, an example in which this characteristic arrangement is applied to semiconductor device 103 of Embodiment 3 will be described.

Figure 9:
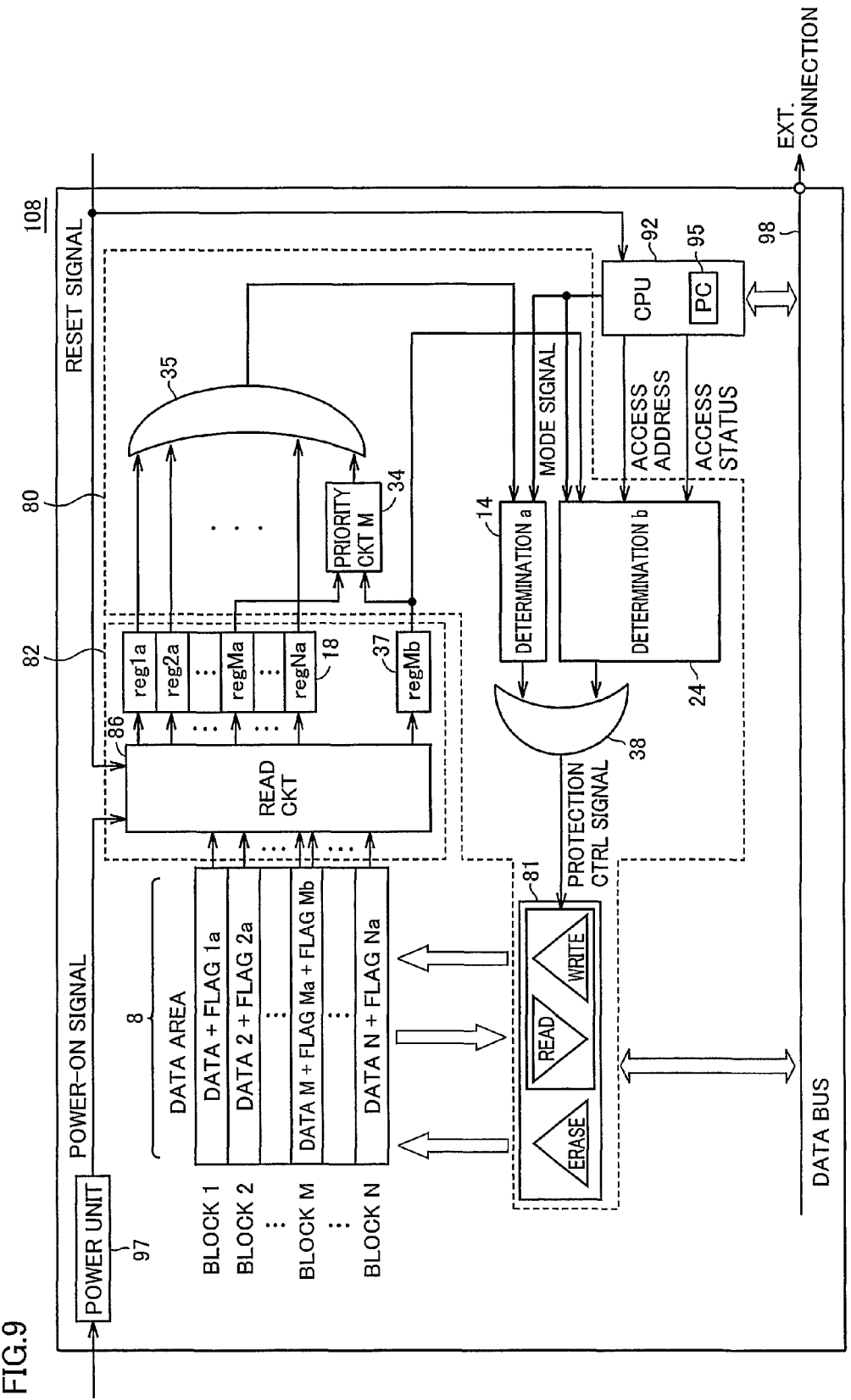
FIG. 9 shows a schematic configuration of a semiconductor device in accordance with Embodiment 8.

Referring to FIG. 9, a semiconductor device 108 in accordance with Embodiment 8 includes a data bus 98, a CPU 92, a non-volatile memory 8, a reading unit 82, a control unit 80, and a power unit 97.

Data bus 98 connects CPU 92, control unit 80, an external memory (not shown) and an external device (not shown) to each other, mediating data exchange.

CPU 92 is the same as that of Embodiment 3 and, therefore, detailed description thereof will not be repeated.

Non-volatile memory 8 includes a data area divided into a plurality of blocks. Non-volatile memory 8 is divided into blocks 1, 2, ..., L, M, ..., N, in which data 1, 2, ..., L, M, ..., N and overall protection flags 1a, 2a, ..., Ma, ..., Na for respective blocks are stored. Further, a partial protection flag Mb for block M is stored in block M.

Reading unit 82 extracts overall protection flags 1a, 2a, ..., Ma, ..., Na and partial protection flag Mb from data stored in non-volatile memory 8, and outputs these to control unit 80. Reading unit 82 includes a read circuit 86 and read registers 18 and 37.

Read circuit 86 receives an external reset signal and a power-on signal from power unit 97, reads data stored in respective blocks of non-volatile memory 8, extracts overall protection flags 1a, 2a, ..., Ma, ..., Na and partial protection flag Mb included in the read data, and outputs these to read registers 18 and 37.

Read registers 18 and 37 are the same as those of Embodiment 3 and, therefore, detailed description thereof will not be repeated.

Control unit 80 corresponds to control unit 30 in accordance with Embodiment 3, with control circuit 31 replaced by control circuit 81.

Receiving a request for canceling protection setting for any of the blocks through data bus 98, control circuit 81 erases the data stored in the block, and changes the value of the overall protection flag or the partial protection flag, to cancel protection setting. Further, receiving a request for setting protection for any of the blocks through data bus 98, control circuit 81 changes the value of the overall protection flag or the partial protection flag stored in the block, to set protection. Other processes performed by control circuit 81 are the same as those of control circuit 31 of Embodiment 3 and, therefore, detailed description thereof will not be repeated.

Priority circuit 34, OR circuits 35 and 38, activation mode determining unit 14 and access mode determining unit 24 are the same as those of Embodiment 3 and, therefore, detailed description thereof will not be repeated.

Power unit 97 is the same as that of Embodiment 3 and, therefore, detailed description thereof will not be repeated.

As described above, in each block of non-volatile memory 8, the overall protection flag and the partial protection flag for setting protection of each block are stored in addition to common data. Therefore, it is possible to set blocks relatively freely as the object of overall protection and partial protection.

In Embodiment 8, an example in which overall protection flag and partial protection flag are both stored with data has been described. Either one of the overall protection flag and the partial protection flag may be stored with the data, and the other may be stored in the protection information area as in Embodiments 1 to 7.

Though an example in which the characteristic arrangement described above is applied to the semiconductor device of Embodiment 3 has been described in Embodiment 8, the arrangement can similarly be applied to any of the semiconductor devices in accordance with Embodiments 4 to 7.

Embodiment 8 attains effects similar to those of Embodiment 3 and, in addition, as the protection information area for storing overall protection and partial protection settings is unnecessary, it becomes unnecessary to arrange a protection information area beforehand for the block as the object of protection. Therefore, a block to be the object of overall protection or partial protection can be selected freely and changed easily. Therefore, a semiconductor device can be realized of which number of blocks as the object of protection can be changed relatively freely in accordance with the program or subroutine to be stored in the non-volatile memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing device comprising a central processing unit and a nonvolatile memory unit, wherein
    the central processing unit is capable of issuing an access request with address information to the nonvolatile memory,
    the nonvolatile memory unit comprises a storage area, which includes plural storage blocks, and control block for reading/storing data from/to corresponding storage block in accordance with the address information in response to the access request from the central processing unit,
    a first storage block is used for storing access permission information, and each of the other storage blocks is capable of setting an access protection by setting the access permission information,
    when the control block receives a request for cancelling the access protection of a second storage block in the other storage blocks, the control block controls erasing data in the second storage block and modifies the access permission information in the first storage block.

2. The data processing device according to claim 1, wherein
    when the control block receives the access request without an instruction fetch request from the central processing unit to the second storage block before cancelling the access protection, the control block prohibits accessing to the second storage block in response to the access request from the central processing unit, and
    when the control block receives the instruction fetch request from the central processing unit to the second storage block before cancelling the access protection, the control block permits accessing to the second storage block in response to the instruction fetch request from the central processing unit.

3. The data processing device according to claim 2, further being capable of coupled with an outer device, wherein
    when the control block receives the access request from the outer device before cancelling the access protection, the control block prohibits accessing to the second storage block in response to the access request from the outer device.

* * * * *